MICROPROGRAM CONTROL FOR A DATA PROCESSING SYSTEM

Filed Oct. 22, 1965 2 Sheets-Sheet 1

INVENTORS
GERALD H. OTTAWAY
HELMUT PAINKE
THOMAS RAGLAND
TITUS SCHELER
HELMUT WILL
WILLIAM V. WRIGHT
BY Melvin P. Williams
ATTORNEY

MICROPROGRAM CONTROL FOR A DATA PROCESSING SYSTEM

Filed Oct. 22, 1965 2 Sheets-Sheet 2

USE CIRCUIT

OP DECODE

United States Patent Office 3,391,394
Patented July 2, 1968

3,391,394
MICROPROGRAM CONTROL FOR A DATA PROCESSING SYSTEM

Gerald H. Ottaway, Hyde Park, N.Y., Helmut Painke, Sindelfingen, Germany, Thomas Ragland, New York, N.Y., Titus Scheler, Boblingen, and Helmut Will, Sindelfingen, Germany, and William V. Wright, Poughkeepsie, N.Y., assignors to International Business Machines Corporation, Armonk, N.Y., a corporation of New York Filed Oct. 22, 1965, Ser. No. 502,195
10 Claims. (Cl. 340—172.5)

ABSTRACT OF THE DISCLOSURE

Disclosed is a microprogram control for a data processing system wherein microprogram control words are stored in a read only store and wherein those words are read out to control the operation of the system. The particular word read out is selected by an address register which specifies a particular word in the read only store. Each word establishes a particular set of control conditions throughout the system. Selection of the next word address is under partial control of a next-address portion of the last word read out. Additionally, selection of the next word address is alternatively under control of the data developed in the system or by that data logically combined with next-address portions of the previous microprogram word.

This invention relates to data processing, and more particularly to an improved microprogram control apparatus therefor.

The modern trend in data processing has been toward a range of computers which are compatible in usage; that is to say, provision of large and small computers which utilize the same language and therefore may be operated by the same programs. In order to achieve small computers which are compatible with large computers, it is necessary to provide a very sophisticated degree of control in the small computers. This tends to complicate the control mechanisms for such small computers and is antagonistic to the low cost which is required of smaller computers.

In order to achieve maximum flexibility of control with a minimum hardware cost, the use of microprogramming has been widely adopted in small data processing systems. In order to achieve the smallest possible system with yet a full range of processing capability (though not processing power), a sophisticated microprogram control apparatus is necessary. A computer of this type is shown in a copending application of the same assignee entitled, Data Processing System, Ser. No. 357,372, filed on Apr. 6, 1964, by G. M. Amdahl et al.

Microprogramming is usually implemented through the use of a control storage, or a decoder, which is utilized in such a fashion that each step of operation calls for a succeeding step, the succeeding steps sometimes being altered somewhat in the manner of a branch operation. The storage device may be a normal storage device having reading and writing capabilities, or may be what is commonly known as a read-only storage device (ROS). A ROS is not capable of having information stored therein in a dynamic fashion, but rather has its information stored in the nature of its construction; thus, a ROS may be thought of as simply a decoder wherein the address is a manifestation in a first code, and a storage word which is therefrom is in fact a manifestation of a second code, the second code providing at least a portion of a third manifestation which comprises a subsequent input word in said first code (i.e., an address of still another storage word).

An object of the present invention is to provide an improved microprogram control for a data processing system.

Further objects of the invention include the provision of:

A flexible micro-instruction set for controlling a data processing system;

An improved software-hardware balance in the microprogram control apparatus of a data processing system; and A microprogram apparatus capable of dynamic control by conditions extant in the computer controlled thereby.

In accordance with the present invention, a plurality of "USE" micro-instructions are provided as part of the micro-instruction set of a data processing system. These instructions are commands which tell the control apparatus to "USE the data, which is being supplied to you, to modify the next-instruction address." In the particular embodiment of the invention set forth hereinafter, three USE instructions are provided; in response to each of these instructions, data supplied on the main data bus of a computer is logically combined (AND, OR, or EXCLUSIVE OR) with next-instruction address bits so as to provide a different set of next-instruction address bits in accordance with the selected logical combination. Thus, micro-instruction referred to as "UOX" means "USE the data from the register specified by the X field by ORing it with the next-instruction address bits," and micro-instruction referred to as "UXX" USES the bits of the register EXCLUSIVE ORed with the related bits of the next-instruction bits.

The purposes of the various instructions differ somewhat. The combination of using the logical AND as well as the logical OR permits testing individual bits, or groups of bits, without saturating the bit combination possibilities as a result of the masking. For instance, supposing an OR mask were used to test the low order bit only: the mask would be 1110. The incoming data in combination with the mask would therefore give 1110 or 1111. In order to test the high order bit, the mask would be 0111 and the resultant value when combined with data would be either 0111 or 1111. Thus, testing either the high order bit or the low order bit may result in a final value of 1111. Now consider what happens when an AND mask is used in order to test the low order bit: a mask of 0001 would be used, and the final result would either be 0001 or 0000. To test the high order bit, a mask of 1000 would be utilized and would yield a result of 1000 or 0000. So again, using the AND mask for testing both the high order and low order bits can yield a result of 0000. Therefore, the combination of the two types of masks is used in order to avoid saturation; for instance, the OR mask may be used to test the low order bits (which gives a result of 1110 or 1111), and the AND mask may be used to test the high order bits giving a result of 1000 or 0000.

On the other hand, the EXCLUSIVE OR function is provided so as to permit changing the bits as a result of the presence of a data bit. A well-known application of this might be to provide modulo 2 summing between data bits and address bits, wherein the address bits are indicative of previous results achieved in accessing the ROS.

The invention, by providing additional masking capability, and by permitting simple logical functions at the input of the ROS, greatly increases the flexibility of the control storage apparatus without requiring costly additional hardware or a complex instruction set. The invention therefore enhances the uses of microprogram control in providing a maximum sophistication within a computer utilizing a minimum of hardware. This in turn paves the way for very small computers which can be compatible with large-scale computers, at least to the degree necessary for upward compatability and for utilization of common instruction sets for similar functions.

Other objects, features and advantages of the present invention will become more apparent in the light of the following detailed description of a preferred embodiment thereof, as illustrated in the drawings.

Figure 1:
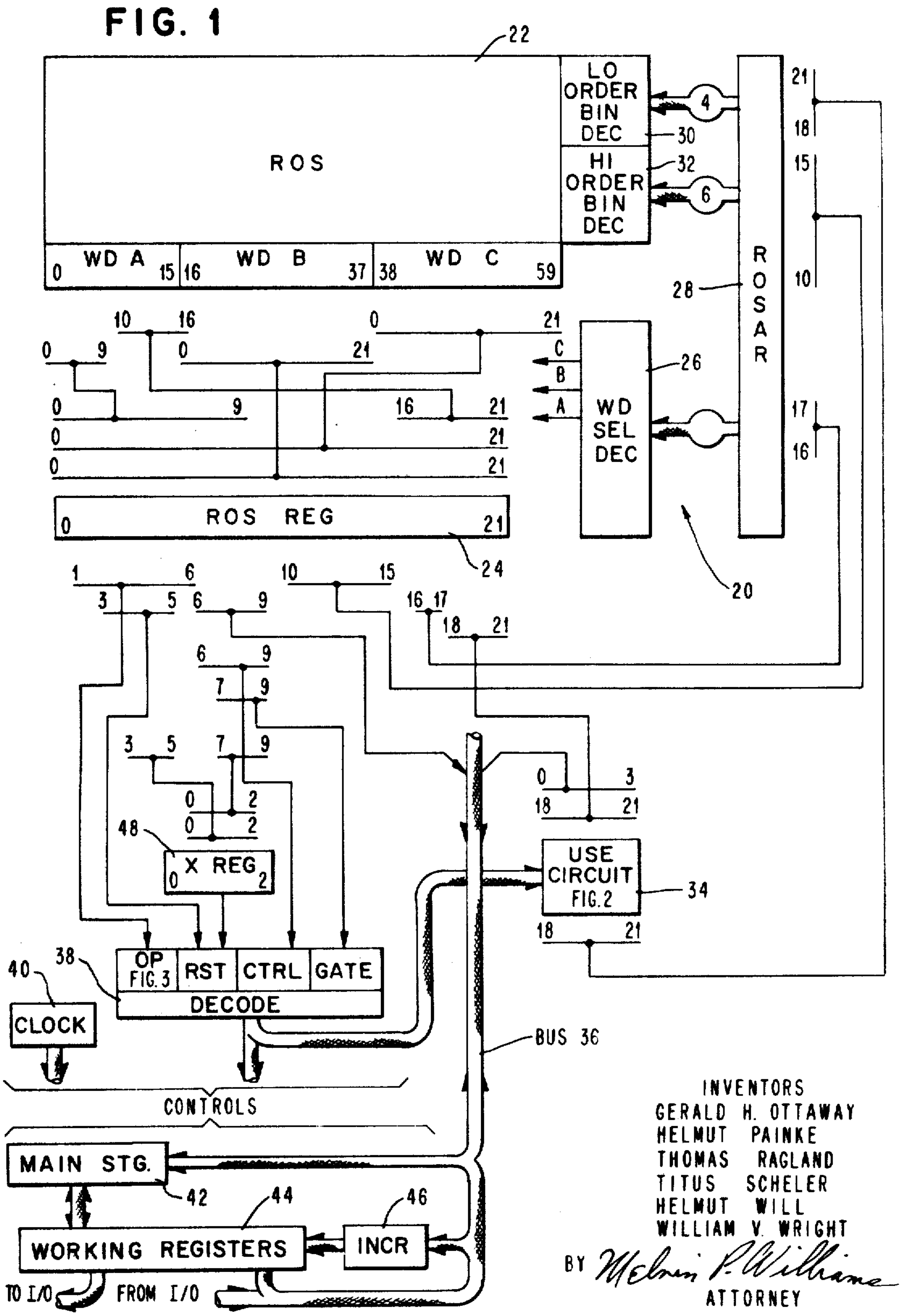
FIG. 1 is a simplified schematic block diagram of a control storaged apparatus capable of utilizing the USE instructions of the present invention.

Referring now to FIG. 1, a control storage apparatus 20 includes a read only storage unit (ROS) 22, an output data register for the read only storage unit, which is called the ROS REG. 24, and a word select decoder (WD SEL DEC) 26, for controlling the selection of one of the instruction words (WD A, WD B, WD C) from the ROS storage word. The control storage apparatus 20 also includes the input address register or ROS address register (ROSAR) 28 and the low order and high order binary decoders 30, 32 which decode the address bits for application directly to the ROS circuits.

The output of the ROS REG 24 is divided so that different bit combinations thereof can be applied to different circuitry. For instance, bits 10–17 are applied directly to corresponding bit positions of the ROSAR 28. These comprise the high order address bits (10–15) of the next-instruction address, and the word selecting bits (16, 17) of the next-instruction address. The low order bits of the next-instruction address (18–21) are applied from the ROS REG 24 to a USE circuit 34 (which is shown in detail in FIG. 2 herein). These bits may be combined in the USE circuit 34 with a like number of bits from the computer's main BUS in response to one of the USE instructions, or may be passed without change to the low order bit position of the ROSAR 28.

Figure 3:
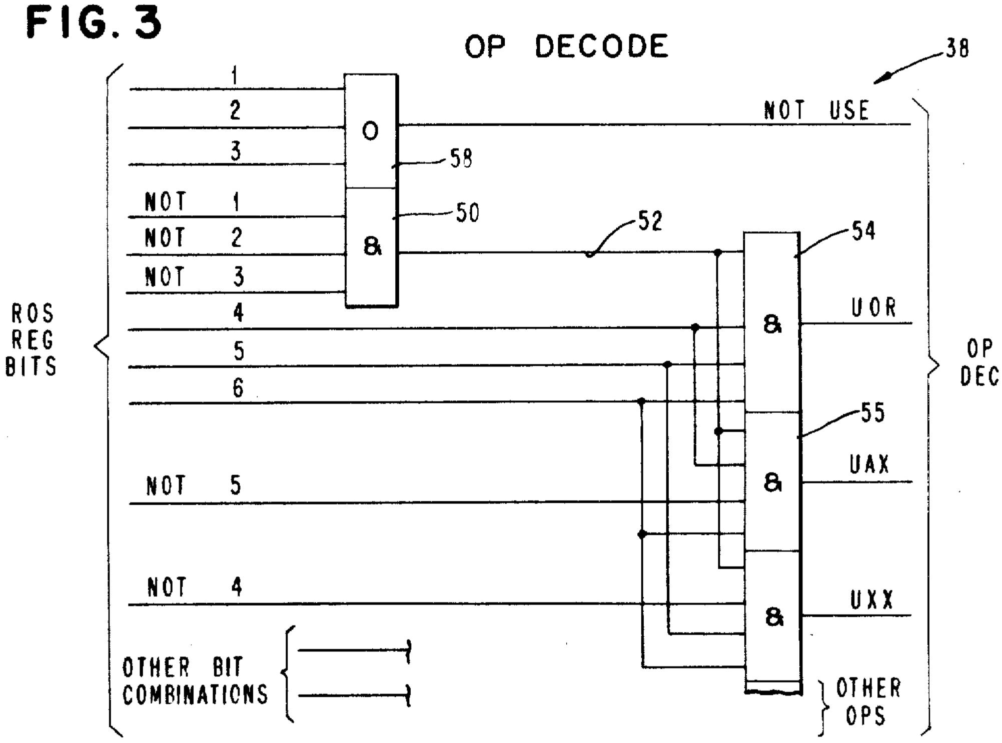
FIG. 3 is a schematic block diagram of a portion of the OP decoder shown in the embodiment of FIG. 1.

Bits 1–9 of the ROS REG 24 are applied in various combination to different parts of a DECODE circuit 38 for providing operational decoding (OP), and register controls, including a control (RST) for resetting and then setting the working registers, a control (CTRL) for selecting different input/output unit functions, and a control (GATE) for gating out data from selected ones of the working registers onto a BUS. The RST portion of the decoder is provided with a buffer register, the X REG 48, so as to permit controlling the working registers very late in a cycle. This is incidental to the present invention. A portion of the decode circuit relating to the decoding of the three USE instructions, or indicating that none of the USE instructions are apparent, and illustrating the fact that other combinations of bits wil decode micro-instructions (OTHER OPS), is shown in FIG. 3. The output of the DECODE circuit 38, together with clocking control from a CLOCK circuit 40 is applied to various parts of the computer, including a MAIN STORAGE 42, WORKING REGISTERS 44, and an incrementer (INCR) 46, as well as to other incidental parts that are not shown in FIG. 1. It should be borne in mind that the nature of the computer is immaterial to the present invention, the circuits 42, 44 and 46 being illustrative merely of main portions of a computer data flow which might be found in a computer utilizing the present invention. Specifically, the invention herein relates to the USE circuit 34, and its relationship in a storage control apparatus, such as the one shown in FIG. 1.

In operation, each micro-instruction cycle provides a storage word from the ROS 22, the storage word including three instruction words (WD A, WD B, and WD C), one of which is selected by the word select decode 26 so as to apply either 22 bits or 16 bits to the ROS REG. 24. Whenever the 16-bit word is selected (WD A), bits 10–15 of the ROS REG 24 remain unchanged; the word selection feature is immaterial to the invention herein, and is described and claimed in a copending application of the same assignee entitled Compact Storage Control Apparatus, Ser. No. 502,196 filed Oct. 22, 1965, by G. H. Ottaway and W. V. Wright. The next succeeding cycle locates a storage word in ROS 22 in dependence upon the setting of bits 10–21, and in dependence, also, upon bits 0–3 of the BUS 36, whenever one of the USE instructions is involved. Thus, each cycle defines, at least in part, the address for the next cycle. Each cycle also provides operational bits (1–9) for controlling the USE circuit 34 as well as for controlling the remainder of the computer (42, 44, 46).

Restating the invention herein, the apparatus of FIG. 1 has the ability to modify bits 18–21 of the ROS register, before utilizing those bits as addresses for the next succeeding cycle, in dependence upon operational control as defined by the OP decode portion of the decode circuit 38, which recognizes whether a USE instruction is involved, and if so, which one.

Decoding of the USE instructions is done in that part of the decode circuit 38 which is illustrated in FIG. 3. In order to simplify the circuitry, the OP decode also develops an appropriate signal when a USE instruction is not involved.

In FIG. 3 an AND circuit 50 responds to the absence of ROS register bits 1, 2 and 3 to provide a signal on a line 52 for application to each of three AND circuits 54–56. Each of these AND circuits is also responsive to different combinations of ROS register bits 4, 5 and 6 so as to develop signals on lines relating to individual ones of the USE instructions. The AND circuit 54 responds to the presence of all three bits 4–6 to generate a USE OR signal on the UOR line, and AND circuit 55 responds to bits 4 and 6 and the absence of bit 5 to generate a USE AND signal on a UAX line, and the AND circuit 56 responds to bits 5 and 6 and the absence of bit 4 to generate a USE EXCLUSIVE OR signal on a UXX line. The OP decode circuit 38 shown in FIG. 3 may also include circuitry to decode other bit combinations into signals indicative of other operations, as illustrated in the bottom of FIG. 3. An OR circuit 58 responds to the presence of bits 1, 2 and 3 to generate a signal on a NOT USE line, which signal is used in combination with the signals on the UOR, UAX, UXX lines in the operation of the USE circuit 34 shown in FIG. 2.

Figure 2:
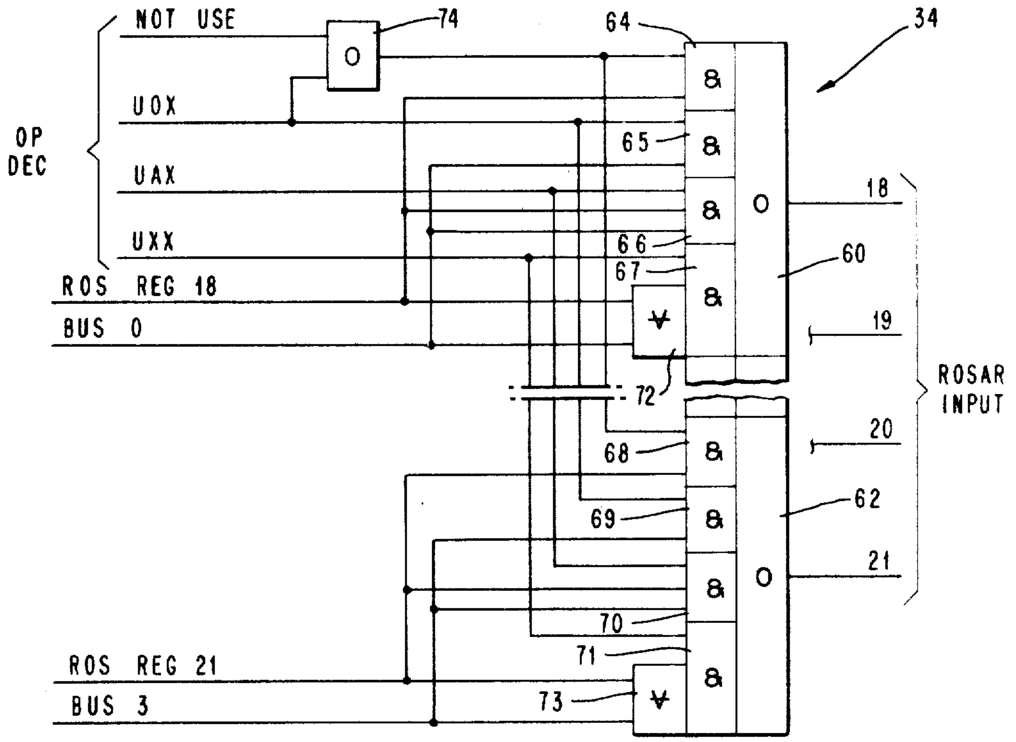
FIG. 2 is a schematic block diagram of a USE circuit as is utilized in the embodiment shown in FIG. 1.

In FIG. 2, a plurality of ROSAR input lines corresponding to bits 18–21 of the ROS address are activated by related OR circuits 60, 62 each of which is responsive to four AND circuits 64–71. The AND circuits 67 and 71 respond to EXCLUSIVE OR circuits 72, 73. The effect of the OR circuits 60, 62 and their related input circuits 64–73 is to provide for the passage of ROS REG bits 18–21 without change, or to permit combining these bits with related bits of the BUS in either the OR, the AND, or the EXCLUSIVE OR combination. In order to pass the bits of the ROS REG without change when a USE instruction is *not* involved, an OR circuit 74 responds to an appropriate OP decode signal on the NOT USE line so as to activate AND circuits 64, 68 which may thereupon respond to the presence of related ROS REG bits so as to cause the OR circuits 60, 62 to generate appropriate signals on the ROSAR input lines. The OR circuit 74 responds to the UOX line to supply a signal to the AND circuits 64, 68 during a USE OR instruction so that the OR circuits 60, 62 may receive a signal either from these AND circuits, *or* from the AND circuits 65, 69 in response to related bits of the BUS. The AND circuits 66, 70 require the presence of related bits both from the ROS REG *and* from the BUS concurrently with a signal on the UAX line in order to operate a related OR circuit 60, 62 during a USE AND instruction. In a similar fashion, a signal on the UXX line will permit the AND circuits 67, 71 to pass a signal from a related one of the EXCLUSIVE OR circuits 72, 73 when there is a corresponding bit from the BUS *or* from the ROS register, *but not both*, during the USE EXCLUSIVE OR instruction.

Thus, the invention, as disclosed in the foregoing embodiment, has the ability to alter in a logical fashion various next-instructions bits in a read only storage control apparatus. Alternatively, the apparatus will pass the bits without alteration when operation of the system so requires.

Although the invention has been shown and described with respect to a preferred embodiment thereof, is should be understood by those skilled in the art that various changes and omissions in the form and details of the invention may be made therein without departing from the spirit and the scope of the invention, which is to be limited only as set forth in the following claims.

What is claimed is:

1. A self-addressed storage apparatus capable of responding to input addresses supplied thereto so as to deliver a storage word therefrom, said storage word including a next-address portion, said next-address portion being utilized to identify a subsequent storage word to be read therefrom, said storage apparatus including a storage output register and an address input register, characterized by:

a source of data bits;

selecting means providing a control signal specifying a logical combination, or not;

and controllable means for selectively logically combining at least some part of said next-address portion with data bits from said source, or not, alternatively in dependence upon the control signal applied thereto.

2. The device described in claim 1, wherein:

said storage word includes an operational portion to define operations relating to said storage apparatus;

and wherein said selecting means is responsive to, and controlled by said operational portion.

3. The device described in claim 2, said controllable means comprising:

OR circuit means for altering said next-address portion by ORing data manifestations from said source with said next-address portion in response to an operational portion relating to a particular operation pertaining to the logical OR.

4. The device described in claim 2, said controllable means comprising:

a logical AND circuit for altering said next-address portion by logical ANDing data manifestations from said source with said next-address portion in response to an operational portion relating to a particular operation pertaining to the logical AND.

5. The device described in claim 2, said controllable means comprising:

an EXCLUSIVE OR circuit means for altering said next-address portion by EXCLUSIVE ORing data manifestations from said source with said next-address portion in response to an operational portion relating to a particular operation pertaining to the EXCLUSIVE OR.

6. The device described in claim 2, said controllable means comprising:

an OR, AND and EXCLUSIVE OR circuit means for altering said next-address portion by ORing, ANDing, or EXCLUSIVE ORing data manifestations from said source with said next-address portion, selectively, in response to a related operational portion relating to a particular operation pertaining to the logical OR, logical AND, or the logical EXCLUSIVE OR, respectively.

7. A data processing system having a controlled storage apparatus, said controlled storage apparatus including a storage device, an output register for storage words read from said storage device, and an address register for controlling the selection of a storage word for application to said output register, storage words presented to said output register including control manifestations and next-address manifestations, said system including return bus means for transferring said next-address manifestations to said address register, said data processing system having a data bus over which data manifestations may be transferred between portions of said system, the improvement which comprises:

selecting means providing a control signal specifying a logical combination, or not;

combining means connected to said return bus for logically combining, or not, said next-address and said data manifestations, alternatively in dependence upon the control signal applied thereto, to form result manifestations, said combining means connected to receive data manifestations from said data bus and connected to supply result manifestations to said address register.

8. The device described in claim 7 wherein said combining means is capable of performing different logical functions, and wherein said selecting means includes, decoding means connecting said output register to said combining means and where said decoding means is responsive to said control manifestations for controlling the logical operation performed by said combining means.

9. The device described in claim 7 additionally comprising:

a plurality of data sources;

and means responsive to said control manifestations for selectively connecting one of said sources to said bus, thereby selecting the source of said data manifestations.

10. The device described in claim 8 additionally comprising:

a plurality of data sources;

and means responsive to said control manifestations for selectively connecting one of said sources to said bus, thereby selecting the source of said data manifestations.

References Cited

UNITED STATES PATENTS

| | | | |
|---|---|---|---|
| 3,130,299 | 4/1964 | Rothbun et al. | 340—172.5 X |
| 3,208,047 | 9/1965 | Ridler | 340—172.5 |
| 3,234,519 | 2/1966 | Scholten | 340—172.5 |
| 3,239,816 | 3/1966 | Breslin et al. | 340—172.5 |
| 3,261,000 | 7/1966 | Behuke | 340—172.5 |
| 3,274,562 | 9/1966 | Strawbridge | 340—172.5 |
| 3,284,778 | 11/1966 | Trauboth | 340—172.5 |
| 3,325,785 | 7/1967 | Stevens | 340—172.5 |

PAUL J. HENSON, *Primary Examiner.*